(12) United States Patent
Noldus et al.

(10) Patent No.: US 8,693,462 B2
(45) Date of Patent: Apr. 8, 2014

(54) METHOD AND DEVICE FOR PROVIDING CORRELATION MEANS IN HYBRID TELECOMMUNICATION NETWORKS

(75) Inventors: Rogier August Caspar Joseph Noldus, Goirle (NL); Jos den Hartog, Capelle a/d Ijssel (NL); Rakesh Taori, Suwon (KR)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1224 days.

(21) Appl. No.: 11/572,987

(22) PCT Filed: Jul. 19, 2005

(86) PCT No.: PCT/EP2005/007835
§ 371 (c)(1),
(2), (4) Date: Apr. 22, 2008

(87) PCT Pub. No.: WO2006/010526
PCT Pub. Date: Feb. 2, 2006

(65) Prior Publication Data
US 2008/0270611 A1 Oct. 30, 2008

Related U.S. Application Data

(60) Provisional application No. 60/592,491, filed on Jul. 30, 2004.

(51) Int. Cl.
| | |
|---|---|
| H04L 12/66 | (2006.01) |
| H04L 12/16 | (2006.01) |
| H04L 12/56 | (2006.01) |
| H04L 29/06 | (2006.01) |
| H04M 7/00 | (2006.01) |
| H04W 76/02 | (2009.01) |

(52) U.S. Cl.
CPC ............... *H04L 65/4007* (2013.01); *H04M 7/0024* (2013.01); *H04W 76/021* (2013.01)
USPC ............ 370/352; 370/259; 370/401

(58) Field of Classification Search
None
See application file for complete search history.

(56) References Cited

U.S. PATENT DOCUMENTS 6,529,972 B1 * 3/2003 Coffman ................. 710/56
6,718,021 B2 * 4/2004 Crockett et al. ......... 379/93.23

(Continued)

FOREIGN PATENT DOCUMENTS

WO  WO 03003767 A  1/2003

OTHER PUBLICATIONS

Vaha-Sipila, A. URLs for Telephone Calls, Network Working Group; RFC 2806. Apr. 2000.

(Continued)

*Primary Examiner* — Asad Nawaz
*Assistant Examiner* — Cassandra Decker

(57) ABSTRACT

Combinational networks provide simultaneous connectivity via networks of different network type between user equipment. For communication sessions on different network types, belonging to the same user equipment, a correlation check is enabled by introduction of an identifier denoted as Combinational Call Indicator (CCI). This CCI identifier in combination with the known Calling Line Identity (CLI) identifier enables user equipment and other and network entities to perform a correlation check between ongoing, or to be established, CScalls and PS-sessions. A user equipment, setting up a related communication session, sets the CCI identifier and provides the CCI identifier during the communication session setup towards the receiving user equipment or network entity, which is enabled to check whether the last received communication session is correlated to the earlier established session due to the presence of the CCI identifier.

36 Claims, 3 Drawing Sheets

(56) References Cited

U.S. PATENT DOCUMENTS

| | | | |
|---|---|---|---|
| 7,099,288 B1* | 8/2006 | Parker et al. | 370/259 |
| 7,190,773 B1* | 3/2007 | D'Silva et al. | 379/142.06 |
| 7,359,373 B2* | 4/2008 | Kuusinen et al. | 370/352 |
| 2003/0074451 A1 | 4/2003 | Parker et al. | |
| 2003/0199273 A1 | 10/2003 | Pecen et al. | |
| 2004/0184439 A1* | 9/2004 | Blanc et al. | 370/349 |
| 2005/0180553 A1* | 8/2005 | Moore | 379/142.01 |

OTHER PUBLICATIONS

3GPP, 3$^{rd}$ Generation Partnership Project; Technical Specification Group Core Network; User-to-User Signalling (UUS) Supplementary Service—Stage 2 (Release 5), 3GPP TS 23.067 v 5.0.0 (Jun. 2002).

3GPP, 3$^{rd}$ Generation Partnership Project; Technical Specification Group Core Network; Customized Applications for Mobile Network Enhanced Logic (CAMEL) Phase 4; CAMEL Application Part (CAP) Specification (Release 5), 3GPP TS 29.078 v6.0.0 (Jan. 2004).

3GPP, 3$^{rd}$ Generation Partnership Project; Technical Specification Group Radio Access Network, UTRAN Overall Description (Release 6), 3GPP TS 25.401 v6.3.0 (Jun. 2004).

ITU-T Recommendation Q.763, ISDN User Part, Formats and Codes, ITU-T Telecommunication Standardization Sector of ITU, Dec. 1999.

ITU-T Recommendation E.164, The international Public Telecommunication Numbering Plan, ITU-T Telecommunication Standardization Sector of ITU, May 1997.

3GPP, 3$^{rd}$ Generation Partnership Project; Technical Specification Group Services and System Aspects; Combining Circuit Switched (CS) and IP Multimedia Subsystem (IMS) services—Stage 2 (Release 10), 3GPP TS 23.279 v10.0.0 (Mar. 2011).

Olsson, U., Nilsson, M. "Combinational Services—The Pragmatic First Step Toward All-IP" Ericsson Review No. 2, 2003, pp. 66-71.

* cited by examiner

METHOD AND DEVICE FOR PROVIDING CORRELATION MEANS IN HYBRID TELECOMMUNICATION NETWORKS

This application claims the benefit of U.S. Provisional Application No. 60/592,491, filed Jul. 30, 2004, the disclosure of which is fully incorporated herein by reference.

FIELD OF THE INVENTION

The present invention relates generally to telecommunications systems, such as fixed, wireless or hybrid communication networks, having a packet- and circuit switched architecture denoted as combinational networks. More particularly, the present invention facilitates a method for relating two or more communication sessions, present or being established in the packet- and circuit switched parts of said networks in an efficient way.

BACKGROUND OF THE INVENTION

Fixed- and especially mobile- networks, such as Global System for Mobile communications (GSM), General Packet Radio System (GPRS) or Universal Mobile Telecommunication System (UMTS) are constantly evolving. GSM/GPRS and UMTS networks today offer both Circuit Switched (CS) connectivity and Packet Switched (PS) connectivity. The PS end-to-end connectivity with its capabilities for transmission of a wide range of data types may be used for offering multimedia services such as image, music and video transfer. The CS connectivity provides a reliable link between two User Equipment by means of one or more trusted network-nodes with a reliable and defined Quality of Service (QoS).

Combinational networks, where two or more links of different type to one or more User Equipment are established, are capable to deploy both CS- and PS-connectivity to a user equipment, thereby enabling services which perform their activity by PS-communication sessions, denoted as PS-sessions and CS-communication sessions, denoted as CS-calls.

As to benefit from this form of service combination, user equipment are required that are capable of handling a CS-call and a PS-session simultaneously. Multi Radio Access Bearer (RAB) terminals for UMTS and Dual Transfer Mode (DTM) terminals for GSM/GPRS networks will be available; these types of terminals provide support for simultaneous CS- and PS-connectivity.

Today, conversational voice cannot be delivered over PS bearers to the end user, due to e.g. insufficient capacity in the Radio Access Networks in operation and therefore existing CS bearers are used for delivering conversational voice. In the future, it may be possible that a single PS bearer is used for conversational voice and multimedia. Nevertheless, DTM terminals today, and possibly UMTS user equipment in the future, will deliver support for simultaneous CS- and PS-connectivity.

In order to give the end-user the look and feel of a single service, although the service may be composed of various CS- and PS-domain services, deployed in the CS-network and the PS-network respectively, it is desirable to determine and deploy some form of relation between ongoing CS-calls or CS-calls that are to be established and the ongoing or to be established PS-session(s).

Some examples of said desired to be determined relation:

1) It should be possible to provide the user of a DTM phone with a rich alert, i.e. as opposed to a simple audio-only alert, as common at a CS-call, the user gets a visual rendering as well. This visual rendering could contain e.g. a photograph of the calling party, the calling party's name or the priority of the call. As far as the receiving party is concerned, it does not matter whether the CS-call was made from a user equipment with PS capabilities or just a "normal" (capable of CS-calls only) phone. In the latter case, an entity in the network, e.g. an Internet protocol Multimedia Subsystem (IMS) may have generated the "rich" part of the call. In this case the alert at the receiving phone, initialised by a CS-network, is related to the visual rendering at the receiving phone 2) To ease user interaction, it should be possible for parties involved in a CS-call to be able to specify with ease (e.g. with a single click of a button) that a picture, video or file shall be sent to the party with which a speech communication is ongoing (i.e., the current CS-call partner). In this case the ongoing CS-call is related to the existing or new PS-session required for sending said data portion.

3) If a CS-call is established between users A and B, it would be desirable to have the possibility to charge the PS-session (e.g. exchange photos, share whiteboard, etc.) between the users A and B with a different tariff than normal (i.e. as opposed to the tariff that applies to the PS-session in isolation), and present the user a single bill. In this case the charging of the PS-sessions is related to the charging of the CS-call as to present said user a single bill, which is traditionally related to CS-calls only.

4) During an ongoing CS-call to a helpdesk or an assistance service, it would be desirable for the helpdesk to have the possibility to send additional multimedia (pictures/video with text) that illustrates a solution to a problem. In this case the ongoing CS-call is related to a PS-sessions where the additional multimedia information is exchanged.

5) It would be desirable to influence a QoS of a PS-session when a CS-call is ongoing. For instance video streaming during the CS-call, comprising a voice call, is handled with a higher priority. Here it is required that the relation between the CS-call and the PS-session has to be known by the user equipment, the network, or by both, as to influence the QoS.

In all these examples stated above, it is desirable to determine a relation between the CS-call and the PS-session in such a way, that the relation is made known in a simple and reliable way without any remarkable delay towards the user equipment or the network. Furthermore it should be ensured towards the user that any costs generated for the PS-session are billed in a trusted way in relation to his/hers CS-call.

The problem that the invention seeks a solution to, is formulated as a two-part problem.

A first part of the problem deals with: "How to find the relation between the CS-call and the PS-session?" More specifically, how can a service determine whether or not a latest service trigger belongs to an ongoing service? This needs to be resolved under different circumstances, namely: the latest service trigger concerns a CS- or a PS-service, the ongoing service itself is a CS- or a PS-service, and finally the service may be resident in the user equipment or in the network. This first part of the problem is defined as how to provide correlation means for correlating the CS-call with the PS-session.

A second part of the problem deals with "How to provide an incentive to start a process for finding the relation between the CS-call and the PS-session?" More specifically, how should an entity indicate, or suggest, or point-out that the CS- and PS-services are correlated? This second part of the problem is defined as how to induce a correlation between a CS-call and a PS-session.

Furthermore it should be desirable that the correlation induction takes place at the communication means of the user or by an intercepting service. Any solution to said problem must fulfill the following requirements:

The correlation between the CS-call and the PS-session should not place extra requirements on the user, i.e. the user should be able to spontaneously place the CS-call or start-up the PS-session, not knowing whether he/she would initiate another, related CS- or PS-service later during that call or session.

Any solution found should work on various networks, even if a mix of various networks is deployed with different protocols. This is applicable when a call crosses a Gateway node between two networks, especially when these two networks are heterogeneous, e.g. GSM & TDM or GSM & PSTN/ISDN etc.

SUMMARY OF THE INVENTION

It is an object of the present invention to provide a method of initialising and enabling correlation of communication sessions present in a combinational network comprising networks of different type being a CS-network and at least one PS-network, where said communication sessions being a CS-call at the CS-network and a PS-session at the PS-network are related to a party having a user equipment deploying said sessions at said different types of networks.

It is a further object of the present invention to provide a user equipment which is arranged for performing said establishment of the correlation between said sessions by means of the method provided.

These objects are achieved by the method as claimed where depending on the type of network (CS or PS) a communication session is setup whereby one or two identifiers are provided to the other party's user equipment.

During a setup of a communication session on a CS-network, a Combinational Call Indicator (CCI) identifier is provided to the other party as to indicate that the communication session might be correlated to an established or to be established communication session on a PS-network between the same parties. In case the setup of the communication session is executed on a PS-network, a Calling Line Identification (CLI) identifier and the CCI are sent to the other party as to indicate that the communication session on the PS-network might be correlated to a communication session on a CS-network between the same parties. The order in which the communication sessions are setup is irrelevant. Even simultaneous setup sessions are allowed.

The method claimed thus provides, with the presence of the CCI identifier, means to detect that a communication session is related with another communication session, and the CCI identifier provides as well an incentive, to verify if the correlation between the communication sessions is present. The order in which the communication sessions are setup is irrelevant for the application of the invention. Even simultaneously setup communication sessions are allowed.

The method according to the present invention is based on the insight that two users, or a user and a network entity, are having simultaneous communication sessions to each other in a combinational network via e.g. a CS- and a PS-network, wherein the communication sessions are regarded "isolated" from each other in that the communication sessions could exist without any reference to each other, even while being related to each other from the user's perspective. In case communication sessions such as a CS-call at the CS-network and one or more PS-sessions at the PS-network should be related from the network point of view, there should exist a correlation between said communication sessions.

The following phases are be identified when attempting to correlate a CS-call and a PS-session:
(1) Establishing that correlation needs to be induced; this decision is taken by one of the users' user equipment or by the network.
(2) Generating references to indicate correlation, and subsequently indicate, append or attach the said reference to a respective CS-call or PS-session bearer, to facilitate subsequent detection of correlation.
(3) Detecting that correlation detection is required.
(4) Executing the required correlation.

The last step of executing the correlation is context dependent and its actual implementation depends on the network type and protocols deployed and is be deployed by known methods.

For the purpose of correlation of the CS-call and the PS-session the following cases are distinguished:
a) a CS-call is ongoing and a PS-session is set up;
b) a PS-session is ongoing and a CS-call is set up;
c) a CS-call and a PS-session are set up simultaneously. For all cases listed above, the correlation can either be induced in the user equipment of the calling A-party or called B-party, or in the network. While, the correlation needs to be detected in the called or calling party's user equipment and/or in the network.

A first part of a solution to the problem stated above is to use an existing identifier, namely a "Calling Line Identity" (CLI) identifier for the purposes of correlation. The CLI is used in ISDN User Part (ISUP), contained in the Calling Party Number (CgPN), as to identify the user or entity that creates a CS-call. The CLI is included in a CS-call establishment process. As a second part of the solution a new identifier, a "Combinational Call Indicator" (CCI) is created, which should be at least a one-bit variable (i.e. a flag), to indicate that the CS-call is part of a potential- or established-combinational call comprising both a CS-call and a PS-session.

Regarding case a above) : in case the CS-call between an A-party and a B-party is ongoing and the PS-session with the B-party is set up by the A-party, a message from the A-party, comprising A-party's CLI and a "set" CCI identifier, is sent towards the B-party's user equipment via the PS-network. On receiving the message with the CCI identifier by B-party's user equipment, B-party's user equipment determines from the presence of the CCI identifier, that the ongoing CS-call is correlated with the incoming PS-session.

Regarding case b); in case a PS-session is ongoing between an A-party and a B-party, and the CS-call by the A-party is set up, a "set" CCI identifier is transferred together with a CS-call alert towards the B-party. As during set-up of the PS-session the CLI of the A-party's user equipment has already been signalled to the B-party's user equipment, the B-party's user equipment determines from the presence of the CCI identifier that the ongoing PS-session is correlated with the incoming CS-call.

Regarding case c); in case the CS-call and the PS-session are set up simultaneously by an A-party, a "set" CCI identifier is initialised by the A-party at both the CS-call and the PS-session A message from the A-party, comprising A-party's CLI and a "set" CCI identifier, is sent towards the B-party's user equipment via the PS-network. Simultaneously a CS-call by the A-party is set up and a "set" CCI identifier is transferred together with a CS-call alert towards the B-party. The CS-call alert and the PS-session setup may be received in arbitrary order at the B-party's user equipment. The CCI identifier, received by the B-party's user equipment in either the CS-call alert or the PS-session setup, indicates that a combinational session is to be expected, where the already received CS-call or PS-session is hence correlated with an expected PS-session or CS-call respectively.

An Internet Protocol Multimedia Subsystem (IMS) application at the user equipment provides the "setting" of the CCI identifier in the CS-call setup and provides the "set" CCI Identifier and the CLI in a message for establishing the PS-session.

As during the setup of the PS-session and the CS-call the CCI identifier is "set" for both communication sessions, and the CLI of the A-party's user equipment is messaged to the B-party's user equipment on both the CS-network and PS-network as well, the B-party's user equipment determines from the presence of the CCI identifier, that the communication session that arrived first is correlated with the next incoming communication session.

The CCI identifier is inserted in the PS-network as well as CS-network signalling. Other properties of the CCI identifier are that it is "writable" (induce-able) by the sending/receiving user equipment of the A-party or B-party as well as by the network, while it is "readable" (detectable) by the network and the sending/receiving user equipment. Furthermore, the network has the capability to delete/modify the CCI identifier from the CS-call or PS-session bearer.

Messages exchanged between said users to establish communication and/or during communication can be intercepted and modified by a "Service Network" comprising network entities having connections to networks of different network types within the combinational network.

The method of the invention as presented provides the user equipment, network entity or the service network, means to establish a correlation between communication sessions at a combinational network comprising different types of networks, where the said communication sessions are deployed by the user equipment having communication sessions at networks of different type. By deploying the CCI identifier, the correlation establishment is induced at the user equipment or the network, wherein the CLI identifier enables the correlation between the communication sessions. By means of this correlation method, as a set of examples, "rich" alerts is provided with a simple user interaction, charging tariff adaptations of the PS-sessions are reliably deployed, multimedia streams could be simply correlated to the ongoing CS-call and the QoS of the PS-session could be influenced based on the establishment of the correlation with the CS-call.

These and other advantages according to the present invention are now illustrated in more detail with reference to the enclosed drawings.

DETAILED DESCRIPTION

Without restrictions to the scope of the invention, in order to provide a thorough understanding of the present invention, the invention is presented against the background and within the scope of the current implementation of a mobile communication system deployed in a combinational network environment. However, the present invention may be deployed in any communication system comprising combinational networks.

Suppose that two users, A-party and B-party have communication sessions ongoing. Said communication sessions between the A-party and the B-party consists of a CS-call provided by a CS-network and a PS-session provided by a PS-network, both communication sessions regarded as "communication components". The said components may be set up one after the other, in an arbitrary order, or simultaneously. User Equipment used by the A-party and the B-party shall allow for CS- and PS-communications sessions simultaneously, which is referred to as dual-mode communication. The said dual mode capability may be present in a single device or in a multitude of devices, such as a split user equipment arrangement where said dual mode user equipment comprises e.g. a mobile phone and a Personal Computer (PC).

Messages exchanged between said users to establish communication and/or during communication can be intercepted and modified by a "Service Network" comprising network entities having connections to networks of different network types within the combinational network.

Figure 1:
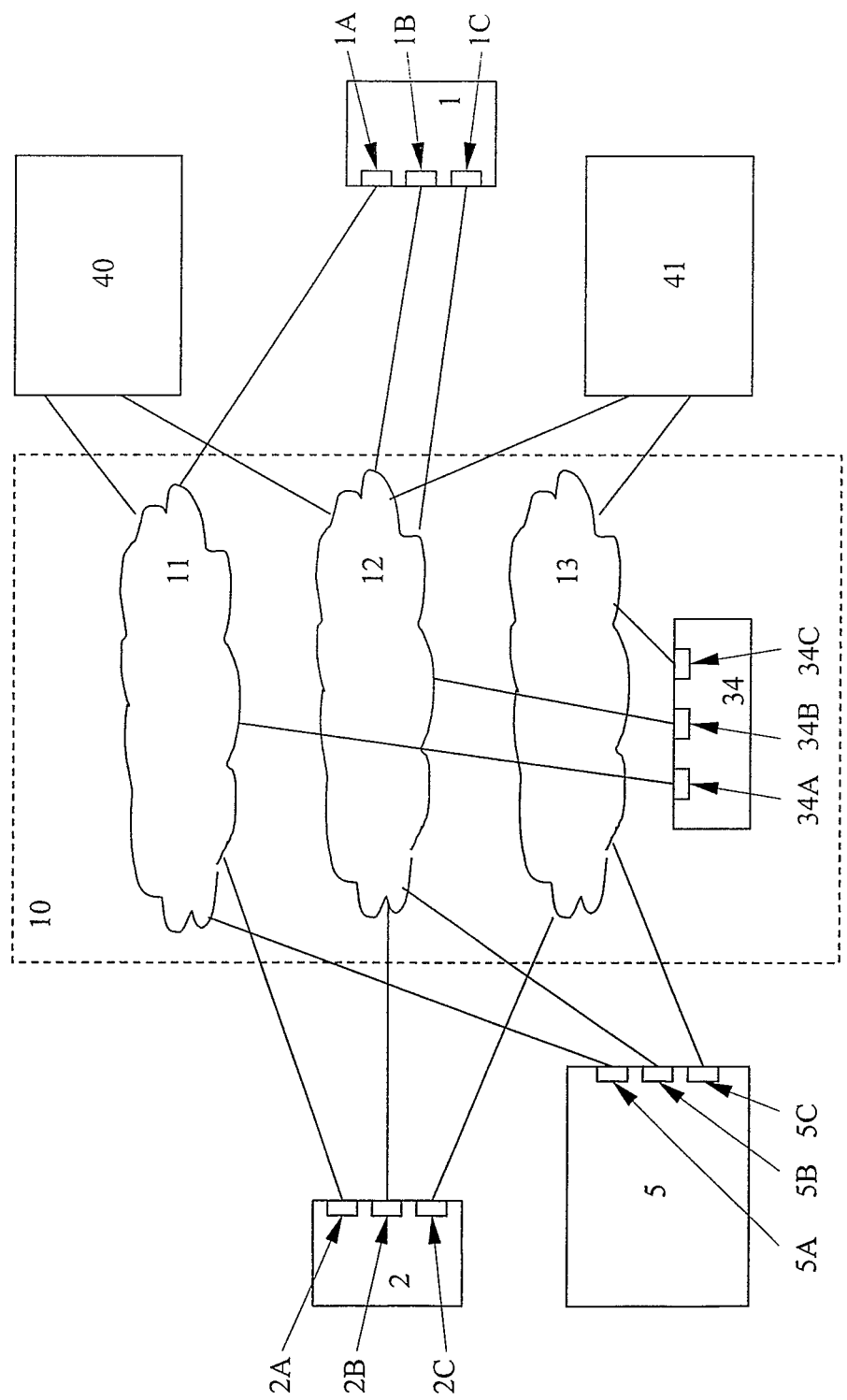
FIG. 1 presents a schematic diagram of a combinational network with two user equipment connected to the network.

FIG. 1 illustrates schematically a combinational network 10 comprising several networks of different network type 11, 12, 13, with a first user equipment 1 and a second user equipment 2 connected to all or some of the networks 11, 12, 13. As to provide physical connection to the networks 11, 12, 13, the user equipment 1, 2 has network interfaces 1A, 1B, 1C, 2A, 2B, 2C, each associated with a network address, towards said networks 11, 12, 13.

For the explanation of the invention, it is arbitrary assumed that network 11 is a network of a CS-network type, and networks 12 and 13 are of a PS-network type.

The A-party may with his/hers first user equipment have a combinational communication session with the B-party by means of user equipment 2, as is explained in the examples below. However the A-party may alternatively have a combinational communication session with a network service node 34 comprised in the combinational network.

In the description below, it will be explained how a correlation of the CS-call with the PS-session will be established by the user equipment 1, 2, followed by an explanation where the correlation will be established by the network 10, implemented as a network based correlation node 5 having connections to networks of different type 11, 12, 13 comprised by the combinational network 10.

The following cases are distinguished, for the purpose of correlation of a CS-call and a PS-session:
a) CS-call is ongoing and a PS-session is set up;
b) PS-session is ongoing and a CS-call is set up;
c) CS-call and PS-session are set up simultaneously.

For all cases listed above it will be regarded that the inclusion of a CLI identifier in the CS-call establishment at the CS-network 11 is prior art.

For case a) the invention will be explained by means of a practical scenario with reference to FIG. 1.

An A-party having the user equipment 1, such as a telephone, calls a B-party having the user equipment 2 by selecting B-party's phone number from an address book in the telephone 1, or by "dialing" B-party's telephone number.

A connection according to prior art will be established by means of the CS-type network 11. At a later instant, the A-party wants to send pictures to the B-party.

For the A-party to experience the foregoing as a single service, the A-party should be required to do no more than just pressing one button to indicate "send the picture to my current CS-call partner".

In response to the click, the A-party's user equipment 1 fetches the PS-network address 2B, 2C, of B-party's user equipment 2, which can be an Internet Protocol (IP) address, a Session Initiation Protocol (SIP) Universal Resource Identifier (URI) or presence URI [RFC 3859—Common Profile for Presence (CPP), The Internet Society (2004)].

The PS-network address of the called B-party's user equipment 2, is known to the A-party's user equipment. In the case that the A-party would retrieve the PS-network address, a PS-address retrieval method is provided by a method disclosed at co-pending application U.S. application Ser. No. 60/592,427. This co-pending application shows a method and device for retrieving the PS address of the combinational call partner, where a retrieval for a PS-network address is initialised by means of a CS protocol over a CS-network. The address retrieval request is being directed to the call partner or a network node that accomplishes the network address request.

When the PS-network address is known to the A-party's user equipment, an exchange of terminal capabilities could be performed If the A-party initiates the picture transmission and presuming a charge of the CS-call and the PS-session (i.e. sending the pictures) should appear on one bill, then the combinational network 10 should be able to determine that the CS-call and the PS-session belong to a single service. In other words, if the CS-call and the PS-session can be correlated, the CS-call and the PS-session are related and form part of a combinational communication session.

For enabling a correlation check the invention provides for the use of identifiers. A first identifier is an existing identifier, namely a "Calling Line Identity" (CLI) identifier for the purposes of correlation. The CLI is used in ISDN User Part (ISUP), contained in the Calling Party Number (CgPN), as to identify the user or entity that creates a CS-call. The CLI is included in a CS-call establishment process.

For correlation induction the invention provides a second identifier, being a "Combinational Call Indicator" (CCI) identifier, which should be at least a one-bit variable (i.e. a flag), to indicate that the CS-call is part of a potential- or established-combinational call comprising both a CS-call and a PS-session.

As to provide means for correlation between the ongoing CS-call by means of the CS-network 11 and a PS-session which is to be established over the PS-network 12, 13, a protocol is used to address B-party's user equipment 2. A suitable protocol would be Session Initiation Protocol (SIP). A SIP INVITE message is sent to B-party's user equipment 2 as to initiate an Internet Protocol (IP) multimedia session, which carries the Calling Line Identification (CLI) of the A-party. Associating A-party's CLI with the SIP INVITE is accomplished in a number of ways.

A logical place to include CLI is the "Call-ID" header in the SIP INVITE message. The Call-ID can be set to equal the CLI in E.164 format (refer to International Telecommunication Union ITU-T Recommendation E.164 [4]). Alternatively, the CLI can be just a part of the composition of the Call-ID, and extra information such as a timestamp can be appended/prepended in a recognisable format. The latter alternative has several advantages in that the A-party is not limited to setting up a PS-session only with the CS-call partner; e.g. the A-Party sets up PS-sessions to another end-point.

Another option to include the CLI is in the "From" header of the SIP INVITE message. The CLI (essentially a telephone number) can be formatted as a telephony Universal Resource Identifier (URI) e.g. sip: +31161245656@kpn.nl and used in the "From" header in accordance with IETF RFC 2806 [1]. The "From tag" in the "From" header of the SIP INVITE message is used to create uniqueness.

A further option is to use the message body of the SIP INVITE to indicate the CLI. Time stamping, in addition to the CLI, can be used as a simple means to create uniqueness between SIP INVITE messages originating from the same user equipment.

In all situations outlined above, the CCI identifier is also indicated (over and above the CLI), e.g. by means of a prefix or a suffix to the SIP INVITE message.

On receiving the message with the CCI identifier, via the PS-session over the PS-network 12, by B-party's user equipment 2, B-party's user equipment 2 determines from the presence of the CCI identifier, that the ongoing CS-call is combinational when the CLI of the CS-call and the CLI retrieved from the PS-session are the same.

On receiving the CCI identifier, the receiving User Equipment or network entity may initiate a procedure to check for a correlation between the communication sessions. A method for carrying out this actual check for determining that the CS-call and the PS-session are correlated, is disclosed at co-pending application U.S. application Ser. No. 60/592,426. This co-pending application shows a method where a number of logical databases is introduced which contain actual data on relations between network addresses and communication sessions, where a correlation check is deployed by a correlation node. The check consists of a number of queries towards said databases or to other network entities, yielding whether the communication session is to be regarded as combinational.

Optionally, it could be the case that the B-party's user equipment 2 may have some settings that require that a correlation is detected in the B-party's user equipment 2, as e.g. it could be that the B-party is only willing to accept PS-sessions from CS-call partners.

This case, remarked as a spontaneous behaviour of the end-users of user equipment 1, 2, implies that the CS-call need not necessarily contain the CCI identifier at the time of call establishment.

Even if the CCI identifier is carried in the CS-call (when no PS-session exists), any user equipment 1, 2 involved or a network node 34 must perform the combinational check, before correlation is established. Since there is no PS-session ongoing when only a CS-call is ongoing, the combinational check will yield a negative result.

For case b) the invention will be explained by means of a practical scenario with reference to FIG. 1. An A-party having the user equipment 1 and a B-party having user the equipment 2 have a chat session (IP multimedia service) ongoing. Due to delays incurred in the chat session, the A-party decides that it is better to have a full-duplex speech conversation while leaving the chat session ongoing, which he/she falls back to when the critical points are discussed in the conversation.

The solution for the present case b) (CS-call set up after PS-session) is very similar to the solution for the case a), (PS-session set up after CS-call). While the PS-session is set up, the identifiers CLI and CCI are carried in a SIP INVITE message in exactly the same way. The only difference is that the identifiers are carried in anticipation that the associated CS-call (requiring correlation) might be set up later. So, the CLI is still carried in the SIP INVITE message in the various ways described at case a).

The difference is how CCI identifier is carried. Once again, note that since the PS-session was set up first, the CCI identifier need not be carried in the SIP INVITE message that sets up the PS-session. But the CCI identifier can be carried in the CS-call.

As is specified above in the present invention, it is assumed that the CS-call uses DTAP, ISUP and DSS1 as bearer. Other bearer types can be used.

As during the set-up of the PS-session the CLI of the A-party's user equipment 1 has already been signalled to the B-party's user equipment 2, the B-party's user equipment 2 is able to determine that the ongoing PS-session is combinational and hence correlated with the incoming CS-call, as the CCI identifier is "set". Please see case a) for a references to disclosure of a method for carrying out the actual check for determining that the CS-call and the PS-session are combinational.

Usually, charging for costs of a call is not trusted when the charging process is established by terminals or user equipment 1, 2, therefore charging is conventionally arranged by the network. When a combinational call is charged e.g. that a reduction of costs of a CS-call is achieved when a simultaneous CS-call and a PS-session are present between an A-party and a B-party's user equipment 1, 2, a network entity verifies whether the CCI identifier is "set" rightly based on the actual presence of said sessions. In case the CCI identifier is invalidly "set", the network entity modifies or disregards the current status of the CCI identifier and does not apply the reduction of costs as presented at the example above.

For case c) the invention will be explained by means of a practical scenario with reference to FIG. 1. An A-party, having user equipment 1 initiates a CS-call to a B-party having user equipment 2 and wants to induce a "rich alert" into the B-party's user equipment 2. This is accomplished by setting up a PS-session simultaneously with the CS-call. An IP Multimedia Subsystem (IMS) application in the A-party's user equipment 1 includes the CCI identifier in the CS-call establishment and includes the CLI identifier in the PS-session establishment.

When the B-party's user equipment 2 receives the CS-call, the user equipment 2 deduces from the presence of the CCI identifier that it shall wait for the corresponding PS-session. When the PS-session arrives, the presence of the CLI in the PS-session indicates that that PS-session is associated with the CS-call indicated by the CLI. The B-party's user equipment 2 now offers the CS-call and PS-session simultaneously to the B-party's user equipment 2. The CS-call and the PS-session form an "enriched alert".

A further example of this case:

The A-party from the example above establishes a CS-call to the B-party's user equipment 2. The network 11, 12, 13, intercepts the CS-call establishment and induces a CCI identifier in the signalling. Simultaneously, the network establishes a PS-session to the B-party's user equipment 2 and includes the CLI from the A-party in the PS-session signalling.

As a result, the B-party's user equipment 2 receives an enriched alert, similarly to the previous example. In the present example, however, the network generates the enrichment of the alert, as opposed to the calling party's user equipment 1.

The implementation of "the network that induces the CCI identifier" is implemented by a correlation node 5, having connections to the networks 11, 12, 13 comprised by the combinational network 10. The correlation node 5 comprises interfaces 5A, 5B and 5C each with an associated network address, towards the networks 11, 12 and 13.

In all the three cases a), b), c) above, the correlation can either be induced in the user equipment 1, 2 of the calling A-party or called B-party or network service node 34, or in the network implemented as correlation node 5. While, the correlation needs to be detected in the called or calling party's user equipment 1, 2 or network service node 34 and/or in the network based correlation node 5.

When correlation of a CS-call and a PS-session needs to be performed by the network, as implemented by correlation node 5, this network node 5 has means to detect the presence of the CCI identifier in the signalling protocol. In an example embodiment of the present invention, the network node 5 includes an Application Server (AS). The protocol that the AS uses to control the CS-call establishment requires suitable information elements to carry the User-to-User Information (UUI) elements, which in turn contain the CCI identifier.

In addition, said control protocol would require a suitable information element to induce, modify or delete the User-to-User Information (UUI), which includes the CCI identifier. Protocols ISUP, DTAP and DSS1 provide possibility to exchange info in UUI elements.

An example of such protocol would be CAMEL Application Part (CAP) (see 3GPP TS 29.078 [6]), which would need to be enhanced to contain the UUI in some of the CAP operations.

When a user equipment 1, 2 in a wireless telecommunication network 11, 12, 13, such as a Mobile Station 1, 2 establishes a Mobile Originated call, it uses User-to-User Information (UUI) elements in the call establishment messages. Refer to 3GPP TS 23.087 [5]. A UUI element is carried over DTAP (from MS to MSC or MSC Server), over ISUP (between exchanges) and over DSS1 (towards a digital subscriber). The signalling network provides for transparent transport of the UUI elements between calling and called party.

UUI elements are used to carry the CCI identifier. The signalling protocols (ISUP, DTAP, DSS1) allow for the use of a UUI element in call alerting (i.e. in the forward direction, from the A-party equipment 1 to the B-Party equipment 2) and in call acceptance (i.e. in the backwards direction, from the B-party equipment 2 to A-Party equipment 1).

The CCI identifier has the form of an at least 1 bit flag, suitable to be fitted into existing protocols such as Session Initiation Protocols (SIP), Direct Transfer Application Part (DTAP), ISDN User Part (ISUP) or Digital Subscriber Signalling 1 (DSS1).

The CCI identifier survives, due to its format, transcription across various networks trough which it traverses. This is applicable when a call crosses a Gateway node between two networks, especially when these two networks are heterogeneous, e.g. GSM & TDM or GSM & PSTN/ISDN.

The CCI identifier will also survive protocol translations, where applicable, e.g. if SIP-T gateways are used.

Resuming the generation, induction, detection and deletion of the CCI identifier, the roles of the various entities in the traffic chain are:

Calling A-party, by means of the user equipment 1: the calling A-party generates the CCI identifier and includes the CCI identifier in the CS-call establishment towards the B-party's user equipment 2 or network service node 34; the calling A-party's user equipment 1 may also receive the CCI identifier from the network, by means of the network based correlation node 5 or from the B-party's user equipment 2/network service node 34.

Network, implemented as network based correlation node 5: the correlation node 5 receives the CCI identifier from the calling A-party's user equipment 1, when it is included in the call establishment towards the B-party's user equipment 2 or network service node 34; the correlation node 5 may also receive the CCI identifier from the called B-party's user equipment 2, when it is included in the call acceptance from the B-party's user equipment 2 or network service node 34 towards the A-party's user equipment 1; the correlation node 5 may also include, modify or delete the CCI identifier in the call establishment towards the B-party's user equipment 2 or network service node 34; and finally, the correlation node 5 may include, modify or delete the CCI identifier in the call acceptance from the B-party's user equipment 2 or network service node 34 towards the A-party's user equipment 1.

Called B-party, by means of user equipment 2 or network service node 34; the called B-party's user equipment 2 or network service node 34 receives the CCI identifier from the correlation node 5 or from the A-party's user equipment 1; the called B-party's user equipment 2 or network service node 34 may also generate a CCI identifier and include it in the call acceptance towards the A-party's user terminal 1.

With reference to FIG. 1, the telecommunication network also comprises a charging subsystem 40 and an authentication subsystem 41. Both subsystems 40, 41 do have connections to two or more networks 11, 12, 13 as to deploy their functionality according to prior art. These subsystems may also be provided by a network node CCI in case of a detected correlation between the CS-call and the PS-session for a certain party.

Figure 2:
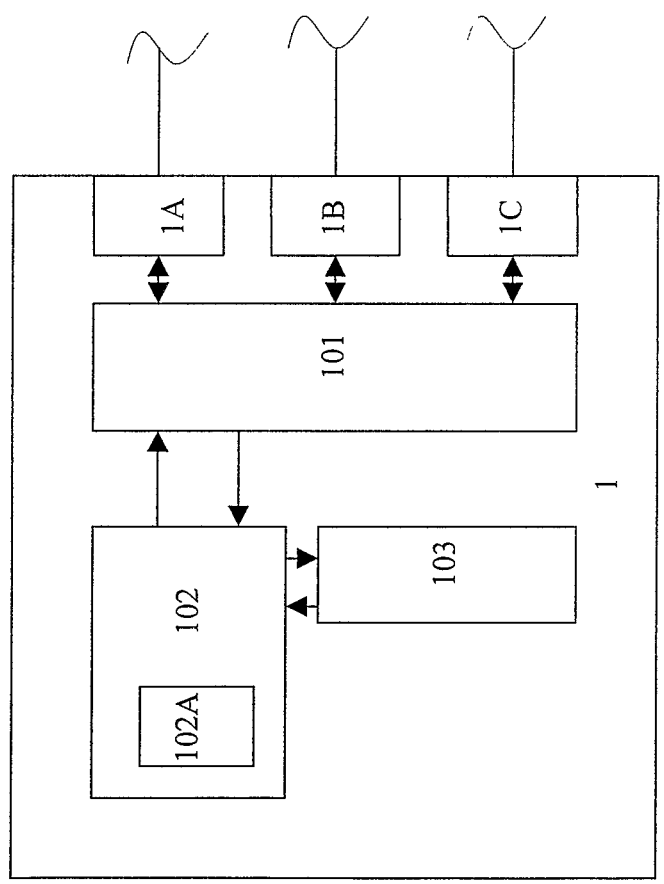
FIG. 2 presents a schematic diagram of a user equipment

FIG. 2 provides a survey of the elements of the user equipment 1. Interfaces 1A, 1B, 1C each associated with a network address, provide connection to networks 11, 12, 13. A processor 102, comprising an application program storage 102A, and a memory unit 103, communicatively connected to the networks 11, 12 13 via Input Output interface 101, is arranged for setting up communication sessions, proving the network address, accepting communication setup and receiving and storing the CCI identifier Correlation node 5 either receives the CCI identifier from the user equipment 1, the user equipment 2, the network service node 34, or provides the CCI identifier, when the node 5 detects via the network interfaces 5A, 5B, 5C to networks 11, 12, 13 that the CS-call and PS-session of A-party's user equipment 1 is correlated in relation towards the user equipment 1, 2, the network service node 34, the charging subsystem 40 or the authentication subsystem 41.

Figure 3:
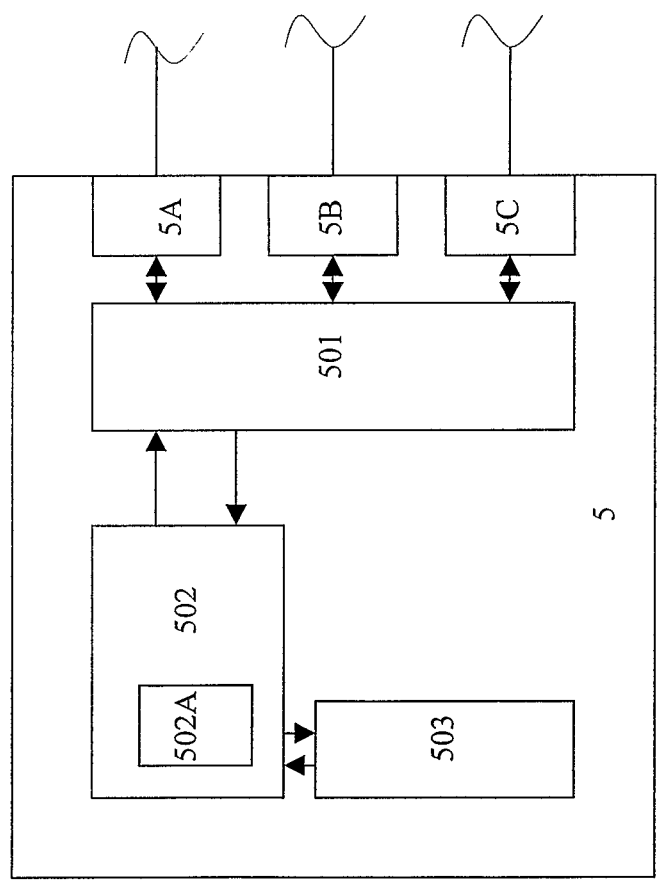
FIG. 3 presents a schematic diagram of a correlation node

With reference to FIG. 3, the correlation node 5 will be further explained. The correlation node 5 is arranged to be queried by the user equipment 1 for verifying the presence of the first and second communication session. The correlation node 5 comprises an I/O unit 501 connected to networks 11, 12, 13 via network interfaces 5A, SB, 5C, a processing unit 502 with an application program storage 502A and a memory unit 503, and is arranged to determine correlation between the first and the second communication session.

By introduction of the method as provided, a simple and reliable method is provided as to enable a correlation check. By introduction of the CCI identifier, in cooperation with the existing CLI identifier, an indication is given that a CS-call and one or more PS-sessions are correlated. Hence a check should only be made in case the CCI identifier is set, thereby preventing execution of checks which were made in cases that there was no correlation although a user equipment has more than one communication session.

The invention as presented provides a solution to the problem as presented at the background of the invention:

1) With a CS-call and the PS-session correlation enabled by the CCI identifier it is possible to provide the user of a DTM phone 1 with a rich alert, comprising e.g. a visual rendering. An IMS network node may have generated the "rich" part of the call, provided in a PS-session. In this case the alert at the receiving phone, initialised by the CS-network, is now related to the visual rendering at the receiving phone by having correlation between the CS-call and the PS-session.

2) With the CS-call and the PS-session correlation enabled by the CCI identifier is possible to ease user interaction, where parties involved in a CS-call are able to specify with ease (e.g. with a single click of a button) that a picture, video or file shall be sent to the party with which a speech communication is ongoing (i.e., the current CS-call partner). In this case the ongoing CS-call is correlated to the existing or new PS-session required for sending said data portion.

3) With the CS-call and the PS-session correlation enabled by the CCI identifier, an ongoing combinational session enables charging of the PS-session (e.g. exchange photos, share whiteboard, etc.) between the A-party and the B-party with a different tariff than normal, and present the user a single bill. In this case the charging of the PS-sessions is correlated to the charging of the CS-call as to present the said user a single bill, which is traditionally related to CS-calls only.

4) With the CS-call and the PS-session correlation enabled by the CCI identifier, it is possible that during an ongoing CS-call to a helpdesk or an assistance service, multimedia (pictures/video with text) that illustrates the solution to the problem is sent. In this case the ongoing CS-call is correlated to the PS-sessions where the additional multimedia information is exchanged.

5) With the CS-call and the PS-session correlation enabled by the CCI identifier the QoS on the PS-session is influenced when the CS-call is ongoing. Video streaming during the CS-call comprising a voice call, can be handled with a higher priority. Here it is required that the relation between the CS-call and the PS-session has to be known by the user equipment, or in the network, or in both, as to influence the QoS.

6) With the CS-call and the PS-session correlation enabled by the CCI identifier a network provider applies a policy to invoke the same services to the second communication session as has been used in the first communication session. If the first communication session has been subject to the rules of a Virtual Private Network (VPN), the second communication session can also be subject to the rules of the same VPN, as the provider relies on the correlation of both sessions.

7) With the CS-call and the PS-session correlation enabled by the CCI identifier, the receiving terminal 2 or network service node 34 may check and detect correlation and applies local policies to a combinational session. E.g. a use always automatically accepts a new session, which is started within the context of an ongoing session. Such when the second communication session is accepted automatically when the first communication session was already ongoing and the CCI identifier was "set".

What is claimed is:

1. A method for providing correlation means within a telecommunications system comprising two or more networks of different network type, the two or more networks being connected to at least a first user equipment and a network entity, where the first user equipment and the network entity have network connections, each network connection associated with a respective network address, to the two or more networks, the method comprising the steps of:

setting up a first communication session by one of the first user equipment and the network entity towards the other of the first user equipment and the network entity, via the network of a first network type;

setting up a second communication session by one of the first user equipment and the network entity towards the other of the first user equipment and the network entity, via the network of a second network type, including providing the network entity with a call session identifier being the network address of the first network type of the first user equipment, the first and second communication sessions being present on the two or more networks of different network type, the network types being a Circuit Switched network type and a Packet Switched network type, and providing a correlation node, connected to the two or more networks, with a Combinational Call Indicator (CCI) variable, the CCI indicating whether the first communication session is combinational with the second communication session, where the correlation node is adapted to determine that the first and the second communication session are combinational when the received CCI variable is set, wherein the setting up of the communication session that is present on the network of the Circuit Switched network type includes providing the CCI variable to the other of the first user equipment or the network entity towards which the communication session that is present on the network of the Circuit Switched network type is set up.

2. The method according to claim 1 wherein the setting up step of the communication session that is present on the network of the Packet Switched network type further comprises the step of:

providing the CCI variable to the other of the first user equipment or the network entity towards which the communication session that is present on the network of the Packet Switched network type is set up.

3. The method according to claim 1 wherein the setting up of the first communication session is performed before or after the setting up of the second communication session.

4. The method according to claim 1 wherein the setting up of the first communication session is performed simultaneously with the setting up of the second communication session.

5. The method according to claim 1 wherein the providing step of the CCI variable is performed by the first user equipment.

6. The method according to claim 5 wherein the call session identifier is provided by the first user equipment or the correlation node.

7. The method according to claim 1 wherein the providing step of the CCI variable is performed by the network entity.

8. The method according to claim 1 wherein the first user equipment or the network entity sends a message to the correlation node that the first communication session and the second communication session are regarded as combinational.

9. The method according to claim 1 wherein the first user equipment or the network entity verifies the established first or second communication session.

10. The method according to claim 9 wherein the first user equipment or the network entity determines that the first and second communication sessions are combinational when it is verified that the first or second communication session are established.

11. The method according to claim 1 wherein the network entity is a second user equipment or a network service node.

12. The method according to claim 11, wherein the first or the second user equipment comprises a user equipment of a type of terminal including a Dual Transfer Mode (DTM) terminal, a Global System for Mobile communications -General Packet Radio System (GSM-GPRS) user equipment or a Universal Mobile Telecommunication System Multi Radio Access Bearer (UMTS Multi- RAB) terminal, with at least one connection to each connected network where said at least one connection is associated with a network address.

13. The method according to claim 12 where the user equipment has either a wire-line connection to the each connected network or a wireless connection to the each connected network.

14. The method according to claim 11 where the first or the second user equipment deploys a communication session by means of a telephone, headset, Global System for Mobile communications (GSM) terminal, Advanced Mobile Phone System (AMPS) or Digital AMPS (D-AMPS) terminal, Digital Enhanced Cordless Telephony (DECT) terminal, Bluetooth terminal, Universal Mobile Telecommunication System (UMTS) terminal, video terminal, Personal Computer (PC) or workstation.

15. The method according to claim 11 wherein a Calling Line Identification (CLI) comprises a network address of one of the first user equipment, the second user equipment or the network service node, the network address being of the first network type.

16. The method according to claim 15 wherein the CLI is included in a header of a SIP Invite message.

17. The method according to claim 15 wherein the CLI is formatted as a SIP URI, to be comprised in a "From" header of a SIP Invite message.

18. The method according to claim 15 wherein an application at the one of the first user equipment, the second user equipment or the network service node generates and sends the CLI at setting up the first or second communication session.

19. The method according to claim 1 wherein the two or more networks and associated network addresses are of Circuit Switched (CS) type or Packet Switched (PS) type.

20. The method according to claim 19 wherein a network address of the CS type is a telephone subscriber number a Public Switched Telecommunications Network (PSTN) number, a Virtual Private Network (VPN) private number, or a number according to the E.164 International Telecommunication Union (ITU) recommendation.

21. The method according to claim 19 wherein a network address of the PS type is a PS network identifier or SIP Uniform Resource Identifier (URI), an Internet Protocol (IP) address, or a Local Area Network (LAN) Media Access Control (MAC) layer address.

22. A user equipment for operation in a telecommunication system, where the telecommunication system comprises two or more networks of different network type and where the user equipment comprises:

a plurality of network connections, each network connection being associated with a respective network address, to the two or more networks, and where the user equipment comprises an Input Output (I/O) unit communicatively connected to the two or more networks by means of the plurality of network connections, where the I/O unit, in cooperation with a processing unit with an application program stored at a program storage and memory unit, is adapted for setting up a first communication session and a second communication session on respectively different ones of the two or more networks of different network type, for providing a network entity a call session identifier being a network address of the user equipment, for accepting communication sessions, for receiving and storing the call session identifier and for querying the network entity or a network node, the network types being a Circuit Switched network type and a Packet Switched network type;

the user equipment being adapted to provide a correlation node connected to the two or more networks with a Combinational Call Indicator (CCI) variable, for indicating that the first communication session might be combinational with the second communication session; and wherein the setting up of the communication session that is present on the network of the Circuit Switched network type includes providing the CCI variable to the network entity.

23. The user equipment according to claim 22 wherein the user equipment is adapted for receiving the CCI variable and for providing the CCI variable to the network entity.

24. The user equipment according to claim 22, wherein the I/O unit is further adapted for retrieving network addresses of the network entity via the two or more networks, and storing the network addresses in the program storage and memory unit.

25. The user equipment according to claim 22, wherein the processing unit with the application program stored at the program and storage memory unit is further adapted for querying the network entity or the correlation node in order to verify the presence of the first communication session and the second communication session, the first and second communication sessions being present on the two or more networks of different network type.

26. The user equipment according to claim 25, wherein the processing unit, loaded with the application program, is further adapted for determining a correlation between the first and the second communication session, and adapted for executing the application program when the first and the second communication sessions are determined to be combinational.

27. The user equipment according to claim 22, wherein the user equipment comprises a Dual Transfer Mode (DTM) terminal, a Global System for Mobile communications - General Packet Radio System (GSM-GPRS) user equipment or a Universal Mobile Telecommunication System Multi Radio Access Bearer (UMTS Multi-RAB) terminal.

28. The user equipment according to claim 27 where the user equipment deploys a communication session by means of a telephone, headset, Global System for Mobile communications (GSM) terminal, Advanced Mobile Phone System (AMFS) or Digital AMPS (D-AMPS) terminal, Digital Enhanced Cordless Telephony (DECT) terminal, Bluetooth terminal, Universal Mobile Telecommunication System (UMTS) terminal, video terminal, Personal Computer (PC) or workstation.

29. The user equipment according to claim 27 where the user equipment has a wireline connection to the two or more networks or a wireless connection to the two or more networks.

30. The user equipment according to claim 22, wherein the user equipment comprises two or more terminals where each of the terminals has at least one connection to each connected network where each of said connections has a network address.

31. The user equipment according to claim 22, wherein the two or more networks and the associated network addresses are of either Circuit Switched (CS) type or Packet Switched (PS) type.

32. The user equipment according to claim 22, having a network address comprising: a CS type network address, a Public Switched Telecommunications Network (PSTN) number, a Virtual Private Network (VPN) private number, or a number according to a E.164 International Telecommunication Union (ITU) recommendation.

33. The user equipment according to claim 22, having a network address comprising: a PS network identifier or SIP Uniform Resource Identifier (URI), an Internet Protocol (IP) address or a Local Area Network (LAN) Media Access Control (MAC) layer address.

34. A correlation node for operation in a telecommunication system, where the telecommunication system comprises two or more networks of different network type, and where the correlation node has network connections, each network connection associated with a respective network address, to two or more of the two or more networks, the correlation node comprising:

an Input Output (I/O) unit communicatively connected to the two or more networks, by means of the network connections, where the I/O unit in cooperation with a processing unit utilizing an application program stored at a program storage and memory unit, the I/O unit being adapted for providing a first user equipment or network entity with a call session identifier, which is the network address of the first network type corresponding to the first user equipment, and for receiving and storing the call session identifier, the network types being a Circuit Switched network type and a Packet Switched network type, the correlation node being adapted to receive a Combinational Call Indicator (CCI) variable, for indicating whether a first communication session is combinational with a second communication session, and, during setup of a communication session on the network of the Circuit Switched type, to provide the CCI to the first user equipment or network entity toward which the communication session on the network of the Circuit Switched type is set up;

where the correlation node is further adapted to determine that the first and the second communication sessions are combinational when the received CCI variable is set.

35. The correlation node according to claim 34 wherein the correlation node is further adapted for determining if the first and second communication sessions between the first user equipment and the network entity are combinational, the first and the second communication sessions being present on the two or more networks of different network type.

36. The correlation node according to claim 34 wherein the correlation node comprises the Input Output (I/O) unit communicatively connected to the two or more networks, by means of interfaces, each interface having a network address, where the I/O unit is adapted for retrieving network addresses of the user equipment or the network entity via the two or more networks, and storing said network addresses in the program storage and memory unit.

* * * * *